United States Patent [19]

Malizio

[11] 4,407,893

[45] Oct. 4, 1983

[54] POLYOLEFIN COATING CONTAINING AN IONOMER FOR METAL SUBSTRATES

[75] Inventor: Andrew B. Malizio, Pelham, Ala.

[73] Assignee: United States Pipe and Foundry Company, Birmingham, Ala.

[21] Appl. No.: 326,979

[22] Filed: Dec. 3, 1981

[51] Int. Cl.³ ......................... B32B 27/32; B05D 3/12

[52] U.S. Cl. .................................... 428/454; 427/195; 427/318; 427/374.4; 428/523; 428/461; 525/196; 525/221

[58] Field of Search ..................... 427/195, 318, 374.4; 428/461, 523, 454; 525/196, 221

[56] References Cited

U.S. PATENT DOCUMENTS

| | | | |
|---|---|---|---|
| 3,762,598 | 10/1973 | Gayner et al. | 220/54 |
| 3,826,628 | 7/1974 | Addinall et al. | 428/472 X |
| 3,900,670 | 8/1975 | Ikeda et al. | 428/308 |
| 3,991,235 | 11/1976 | Miller et al. | 427/195 |
| 4,049,904 | 9/1977 | Hori et al. | 174/107 |
| 4,092,452 | 5/1978 | Hori et al. | 428/215 |
| 4,109,037 | 8/1978 | Nohara | 428/35 |
| 4,254,165 | 3/1981 | Phelps et al. | 427/195 |
| 4,268,531 | 5/1981 | Whiting | 426/126 |
| 4,279,344 | 7/1981 | Holloway | 206/631 |
| 4,293,664 | 10/1981 | Lustig et al. | 525/196 |
| 4,337,298 | 6/1982 | Karim et al. | 525/221 X |
| 4,371,583 | 2/1983 | Nelson | 428/358 |

FOREIGN PATENT DOCUMENTS

| | | | |
|---|---|---|---|
| 55-71733 | 5/1980 | Japan | 525/221 |

OTHER PUBLICATIONS

"Ionomers, Chemistry and Developments" Kinsey, Applied Polymer Symposia, No. 11, 77-94 (1969).

"Ionomers in the Polyolefin Marketplace", Kinsey, 1975, E. I. DuPont de Nemours and Co.

Ionomer, Modern Plastics Encyclopedia; R. H. Kinsey.

Surlyn-Molding Guide, Technical Publication, E. I. DuPont de Nemours & Co.

*Primary Examiner*—Shrive P. Beck

*Attorney, Agent, or Firm*—James W. Grace; Charles W. Vanecek

[57] ABSTRACT

A method for coating a metal surface by depositing a mixture comprising a polyolefin and an ionomer on the metal surface, which is at a temperature sufficient to fuse the mixture to the metal surface, and thereafter cooling the resulting coated surface; and the coated article produced by the method. The method is especially useful in coating a ferrous metal surface, such as, for example, the interior surface of a pipe.

32 Claims, 3 Drawing Figures

POLYOLEFIN COATING CONTAINING AN IONOMER FOR METAL SUBSTRATES

BACKGROUND OF THE INVENTION

1. Field of the Invention

This invention relates to a method for coating an article with a thermoplastic coating, more especially a polyolefin composition, containing an ionomer, and to the article produced thereby. More particularly, this invention relates to a method of applying a polyolefin polymer or copolymer coating, more specifically a polyethylene coating, containing an ionomer to a metal surface, such as the inner surface of a metal pipe, to provide an article having a strongly adherent protective coating.

2. Description of the Prior Art

It is well known to coat articles with thermoplastic materials for protection against corrosion and various other purposes. Polyethylene compositions have been used extensively in the coating of metal articles, such as the lining of tanks and chemical equipment, the inner surfaces of pipes, etc. For example, U.S. Pat. No. 4,007,298 discloses a method of coating metal articles with a blend of high and low density polyethylene powders. While various prior art polyethylene coatings have displayed fairly satisfactory adhesion to metal substrates, under certain environmental conditions these coatings become subject to underfilm corrosion (so-called "undercutting"). This "undercutting" phenomenon is most evident at places where, due to the coating's cracking or stripping, the substrate or body of the coated article becomes exposed to the corrosive environment in which the article is used.

It would be highly desirable if an improved method of applying a thermoplastic material to a substrate could be found which is relatively simple and inexpensive to perform and yields a highly adherent and corrosion-resistant coating.

OBJECTS OF THE INVENTION

It is therefore an object of the present invention to provide an improved coating, especially for ferrous metal objects, that adheres tenaciously to the object even when subjected to a highly corrosive environment.

It is another object of the present invention to provide a composition that can be readily applied to difficultly coverable surfaces to form a continuous protective coating on such surfaces.

It is still another object of the present invention to provide an improved method for applying a coating to a substrate, especially a ferrous metal substrate, which is simple to perform and yields a highly adherent and corrosion-resistant coating.

Other objects and advantages of the present invention will become apparent to those skilled in the art when the instant disclosure is read in conjunction with the accompanying drawings.

SUMMARY OF THE INVENTION

The above objects have been achieved in the protective coating and method of the present invention, wherein a composition comprising a polyolefin and an ionomer is applied to a metal surface, preferably a ferrous metal surface, to produce a tenaciously adherent and corrosion-resistant coating on such surface. The coating of the invention suitably is made from a blend of polyethylene and an ionomer, wherein the polyethylene component preferably comprises a mixture of high density polyethylene and low density polyethylene. A desirable weight ratio of high to low density polyethylene is from about 1:1 to 1:3. The blend also advantageously includes a filler material, as, e.g., sand.

The amount of ionomer in the coating composition of the invention can vary over a wide range. However, since the ionomer is relatively expensive, it is advisable to use only what's needed to achieve the degree of adhesion and protection against deterioration desired for any given coating operation. The coating composition of the invention can contain, for example, about 4 to 80 percent by weight ionomer. The presence of the ionomer in the coating composition increases the flowability of the blend and is found to contribute to an exceptionally high bonding strength between the composition and the substrate and to practically eliminate underfilm corrosion in various severely corrosive environments.

According to the method of this invention, the ingredients of the coating composition can be applied to the metal surface in various ways, such as by spray or dip methods. Before the coating composition of the invention is applied to the metal surface, the surface is suitably subjected to various conventional preliminary treatments, such as grinding or grit-blasting,. In a preferred embodiment, the ingredients, including the ionomer, are mixed to form a homogenous blend or mixture using conventional dry material mixing equipment and techniques. This blend is uniformly deposited on the metal surface to be coated, the metal surface being preheated, as, e.g., at about 500° to 700° F., to bring about a melt-coating of the blend's resins on the metal surface. After the deposition of the coating on the metal surface and its formation into a continuous covering layer over said surface, the resulting coated article is cooled to effect solidification of the resins and produce the coated article of the present invention.

DESCRIPTION OF THE DRAWINGS

The invention will now be described with reference to the accompanying drawings in which.

DETAILED DESCRIPTION OF THE INVENTION

Figure 1:
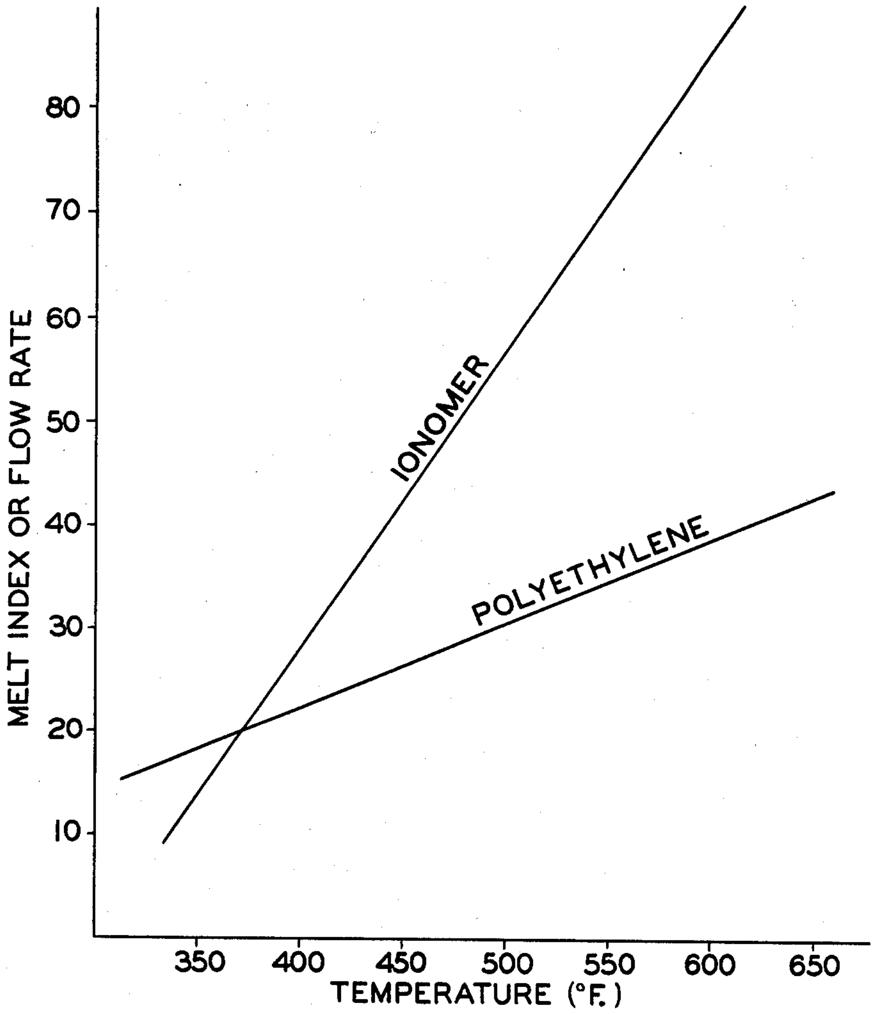
FIG. 1 is a graph of melt temperature versus melt index for an ionomer and a polyethylene.

According to the present invention, highly adherent bonds between metal surfaces and polyolefin compositions can be obtained by incorporating an ionomer in the polyolefin composition. The ionomer resin of the invention is a polymer wherein organic and inorganic components are bonded together by a covalent bond and an ionic bond, as defined, for example, in U.S. Pat. No. 4,109,037. More particularly, the ionomer resin of the invention is a metal ion-containing polymer of an olefin monomer and an ethylenically unsaturated monomer containing a carboxyl radical, wherein a portion of the carboxyl radical content is neutralized by metal ions, such as sodium or zinc ions. Resins which can be obtained from E. I. du Pont De Nemours & Co. under the trade designation Surlyn are examples of ionomers which have been found useful in the practice of the present invention. The ionomer is employed in an amount sufficient to increase the adhesiveness of the polyolefin composition to the metal surface and to increase the flowability of the blend or mixture of the invention.

The method of the present invention is particularly effective in improving the performance of blends of low and high density polyethylene as coatings for metal surfaces. However, the method is also suitable for forming coatings of other olefin polymers and copolymers. Suitable olefin polymers and copolymers include polyethylene, polypropylene, polyethylene-polypropylene copolymers, ethylene-vinyl acetate copolymers, and ethylene-unsaturated carboxylic acid and ethylene-unsaturated carboxylic acid ester copolymers. The polyolefin can comprise, for example, about 20 to 96 weight percent of the coating composition of the invention.

In the broadest aspects of the present invention, any metal which is normally coated with thermoplastic resins can be treated with the polyolefin/ionomer composition of the invention. Suitable metals include aluminum, copper, iron, steel, silver, gold and tin. The method of the invention is especially useful in coating ferrous metal surfaces, such as the surfaces of cast iron and ductile iron pipes and fittings.

Various conventional additives may be added to the coating composition of the invention, including pigments, reinforcing agents, stabilizers, and fillers. Filler materials constitute particularly useful additives for utilization in the coating composition. The filler suitably serves as an inert reinforcement for the resins. Examples of suitable fillers include silicates; metallic oxides; metallic powders such as aluminum, stainless steel, etc.; carbides; minerals, such as sand, limestone, clay; glass, etc. A fine round grained sand (AFS 95) is a preferred filler. The filler can constitute about 10 to 70 weight percent of the coating composition of the invention.

It is preferred in accordance with the present invention to employ a polyolefin resin comprising a mixture of high and low density polyethylenes. The two ingredients in the form of powders are advantageously blended in the weight ratio of high density polyethylene to low density polyethylene of from about 1:1 to 1:3. A blend with a weight ratio of high density polyethylene to low density polyethylene of about 1:1 has been found to be especially useful. The blend can consist, for example, of high density linear polyethylene powders with the following range of properties: 0.945 to 0.960 density, 6 to 18 melt index and 35 to 50 mesh particle size, such as U.S. Industrial Chemicals Company's ML-713, U.S. Industrial Chemicals Company's MA-778 and Phillips Petroleum Company's BMN TR-980, and low density polyethylene powders with the following range of properties: 0.91 to 0.92 density, 16 to 25 melt index and 35 to 50 mesh particle size, such as U.S. Industrial Chemicals Company's MC-91007, U.S. Industrial Chemicals Company's 711-942, or Union Carbide Corporation's DNPA 0408.

The ionomer resin, also in the form of a powder, is mechanically mixed with the polyethylene resins in forming the blended coating composition. The amount of ionomer blended into the mixture can vary over a wide range, such as from about 4 to 80 percent by weight of the mixture of resins. The size of the ionomer resin particles similarly may vary over a broad range, as, e.g., from about 30 to 500 microns.

The ionomer resins employed can have a broad range of melt indices, as, e.g., melt indices of from 5 to 100. High melt index ionomers, such as those having melt indices of from about 14 to 100, are especially useful in the method of the invention. A particularly suitable ionomer of the invention has a melt index of 20. The melt index of both the ionomer and the polyethylene may be approximately the same. However, these two materials behave quite differently at the temperatures they are subjected to according to the invention. The graph shown in FIG. 1 illustrates this. It can be seen that at about 525° F. the ionomer has twice the flow rate of the polyethylene. It is theorized that the ionomer resin, even when present in low concentration in the blend of the invention, has the effect of significantly improving the flow characteristics of the blend and hence its capacity to protectively cover the metal substrate. Through use of the ionomer resins adherence of the polyethylene coating to the metal substrate is increased and hard to coat areas are readily covered without a tendency for holidays.

Other additives, such as the filler material, also can be included in the blending step. Blending of all the ingredients is conveniently accomplished by using a U- or V-shaped rotating drum type blender or other satisfactory dry powder blender.

A very satisfactory coating is produced in accordance with the invention by employing a resin blend comprising about 20 to 48% by weight low density polyethylene, about 20 to 48% by weight high density polyethylene, and about 60 to 4% by weight ionomer. Another preferred coating composition of the invention comprises about 33⅓% by weight filler, preferably sand, about 22 to 30% by weight low density polyethylene, about 22 to 30% by weight high density polyethylene, and about 22 to 7% by weight ionomer.

Prior to coating a ferrous metal surface in accordance with the present invention, the metal surface is suitably cleaned, such as by grinding or grit-blasting, and heated to a temperature sufficiently high to fuse the blend to the surface. Application of the coating is accomplished by entraining the desired amount of blended powder in an air stream and directing the air stream and entrained powder onto the hot (500° to 700° F.) ferrous metal surface. The method is particularly useful in coating the hot, rotating, internal metal surface of a pipe or like structure. After application, the coating advantageously is kept in an atmosphere of from about 400° to 600° F. for a short period of time, as, e.g., from 5 to 15 minutes. The blend of powders fuses together into a uniform coating which completely covers the metal surface. The method of the invention is capable of applying to ferrous metal surfaces coatings of any suitable thickness. Coatings of various thicknesses can be produced by simply varying the amount of powder applied to the surface. Generally, the coatings have a thickness of about 15 mils to 65 mils.

Other well-known coating methods can be employed for applying the blend of this invention to metal surfaces. For example, the blended powders can be applied by the fluidized bed method, wherein the metal surface to be coated is preheated and brought into contact with a fluidized bed of the blended powder. Also, commercially available electrostatic coating devices can be used to apply the blended powders to various metal substrates, such as to ductile iron pipe fittings.

The invention is further illustrated by the following example.

EXAMPLE

Blends of the invention containing ionomer resins manufactured by E. I. du Pont De Nemours & Co. under the trademark "Surlyn" were prepared and applied to the inside of ductile iron pipe which had been heated to about 700° F. The following Table shows the quantities of the various ingredients used in the blends.

TABLE

| Blend No. | High Density Poly-ethylene | Low Density Polyethylene | Ionomer (DuPont-Surlyn) | Melt Index* of Ionomer | Sand AFS 95 Round Grained |
|---|---|---|---|---|---|
| 1 | 33.3 lbs. | 33.3 lbs. | 33.3 lbs. | 100 | 50 lbs. |
| 2 | 33.3 lbs. | 33.3 lbs. | 33.3 lbs. | 14 | 50 lbs. |
| 3 | 45 lbs. | 45 lbs. | 10 lbs. | 20 | 50 lbs. |
| 4 | 25 lbs. | 50 lbs. | 25 lbs. | 100 | 0 |
| 5 | 0 | 50 lbs. | 50 lbs. | 100 | 0 |

*ASTM D-1238 at 190° C.

The blends of the above Table were prepared from a high density polyethylene obtained from U.S. Industrial Chemicals Company, MA-778, with melt index 6, density 0.949, 35 mesh powder; a low density polyethylene also obtained from U.S. Industrial Chemicals Company, MC-91007, with melt index 22, density 0.916, 35 mesh powder; and the ionomer powders having the melt indices listed in the Table. A fine round grained sand (AFS 95) was blended with the resin powders in the case of Blend Nos. 1 to 3.

The particle size of the resins to be blended may vary from about 10 mesh to 325 mesh. However, since blending very fine resin particles can be difficult, it is preferred to use larger particle sizes. A preferred particle size for the resins is about 35 mesh. The particle size of the filler material may range from about 40 mesh to about 325 mesh. A fine round grained sand (AFS 95) is a preferred filler. Such a filler is readily coated when the other ingredients of the blend melt.

In Blend Nos. 1, 2, 4 and 5 of the above Table, the ionomer particle size was about 450 microns, and in Blend No. 3 the ionomer particle size was about 45 microns. The particle size of the polyethylene particles in all the blends was about 450 microns. The 45 micron ionomer was difficult to handle and had a tendency to remain airborne in the coating operation. The larger particles, however, presented no problems when applied by entraining them in an air stream directed at the surface to be coated. The blends were prepared by placing the desired ingredients in a "U" type motor driven mortar mixer. Mixing time was only about six minutes, at which time a uniform blend was observed. Each blend was used to coat the entire inside surface of a cast ductile iron pipe which had been ground to remove most surface imperfections.

Figure 2:
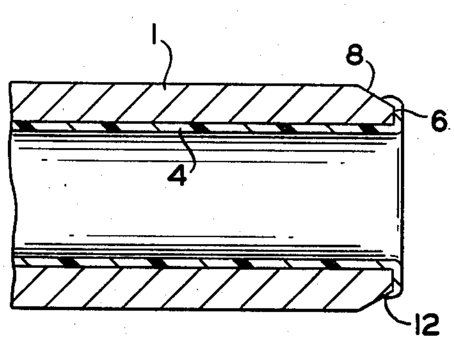
FIG. 2 is a fragmentary sectional view of a pipe coated according to the present invention.

Referring now to FIG. 2 of the drawings, a pipe 1 was heated in an oven to about 700° F., removed and placed on a rotating mechanism where it was rotated about its longitudinal axis at a rate that would cause a particle on its inside surface to exert a force of from 6 to 9 times that of gravity. With pipe 1 at about 700° F., the blend to be applied was entrained in an air stream and directed at the inside surface of the rotating pipe so that a uniformly thick layer of about 0.04 inches was deposited. The mixture of powders became plastic and flowed into the ground anchor pattern of the surface, forming a very uniform smooth coating 4 on the entire inside surface of the pipe. This melting and fusion of the powder caused the pipe to cool rapidly to about 550° F., and as rotation continued the pipe was allowed to cool substantially below this temperature to assure uniform cooling to about 400° F. It was observed that the melt of Blend Nos. 1 to 5 containing an ionomer flowed onto end face 6 and even wrapped around the end face, coating a small part of beveled surface 8. This phenomenon, whereby the coating seemed to work its way around the end face by some sort of capillary attraction, was quite unexpected since centrifugal force should have prevented it, but it is very beneficial because it removes the coating edge from the path of any fluid running through the pipe.

Figure 3:
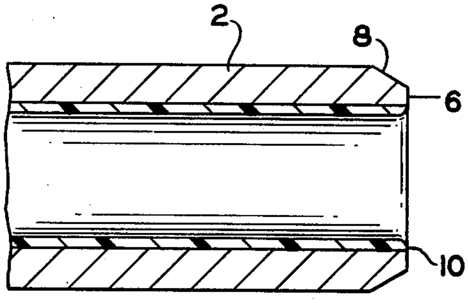
FIG. 3 (PRIOR ART)
FIG. 3 is a fragmentary sectional view of a coated pipe of the prior art.

Three comparative blends were prepared in the same manner as Blend Nos. 1 to 5 of the above Table, except that the ionomer resin was omitted from each comparative blend. Thus, for example, the comparative blend to Blend Nos. 1 to 3 contained 50 lbs. high density polyethylene, 50 lbs. low density polyethylene, and 50 lbs. sand, and so forth for the comparative blends to Blend Nos. 4 and 5. Referring now to FIG. 3 of the drawings, each of these comparative blends was applied to a pipe 2 by the same procedure employed for Blend Nos. 1 to 5 of the invention, with the result shown in FIG. 3. It can be seen that neither end face 6 nor beveled face 8 was coated. Furthermore, it also can be seen that coating edge 10 of the comparative coating is in the flow path of any fluid flowing through the pipe while coating edge 12 of the coating of the invention (FIG. 2) is removed from such flow path. Underfilm corrosion is much less apt to occur with the coating edge so removed than with the comparative coating where the coating edge remains in the flow path.

Both the coatings prepared from Blend Nos. 1 to 5 of the invention and the comparative coatings were tested to determine their degree of adhesiveness to the metal substrate and their resistance to underfilm corrosion when exposed to a highly corrosive environment. Attempts to lift the coatings from the metal substrate showed that the coatings of the invention containing an ionomer adhere more tenaciously than the comparative coatings. Also, coupons about three inches square were cut from the coated pipe and immersed in salt water. After a few months, the comparative coatings showed signs of underfilm corrosion along the cut edges of the immersed coupons while no such corrosion was visible on the coupons coated with inventive Blend Nos. 1 to 5.

The present invention provides an improved ionomer-containing polyolefin blend which can be applied to a metal substrate to yield a coating which not only adheres tenaciously to the substrate but also resists underfilm corrosion even when exposed to severely corrosive conditions, such as immersion in salt water. The ionomer causes the polyolefin coating to remain well bonded to the substrate long after the polyolefin by itself allows underfilm corrosion. No special technique is required to incorporate the ionomer in the polyolefin. A simple blending operation suffices to produce a homogenous mixture of resins which can be readily melt-coated onto a metal surface, yielding the excellent protective coating of the present invention.

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

I claim:

1. A method of coating a metal surface which comprises the steps of:
(a) providing a mixture comprising a polyolefin and an ionomer, said polyolefin being a member selected from the group consisting of polyethylene, polypropylene, an ethylene-vinyl acetate copolymer, an ethylene-unsaturated carboxylic acid copolymer, and an ethylene-unsaturated carboxylic acid ester copolymer,
(b) grinding or grit-blasting said metal surface to form an anchor pattern thereon,
(c) depositing said mixture on said anchor pattern of said metal surface, said metal surface being at a temperature sufficient to (1) cause said mixture to flow into said anchor pattern and (2) fuse said mixture to said metal surface, whereby said mixture melts to form a coating on said metal surface, and
(d) cooling the coated surface to effect the bonding of said coating to said metal surface.

2. The method of claim 1 wherein said metal surface is a member selected from the group consisting of aluminum, copper, iron and steel.

3. The method of claim 1 wherein said metal surface is a ferrous metal.

4. The method of claim 1 wherein said metal surface is a member selected from the group consisting of cast iron and ductile iron.

5. The method of claim 3 wherein said polyolefin is polyethylene.

6. The method of claim 1 wherein said polyolefin is a blend of high density polyethylene and low density polyethylene.

7. The method of claim 6 wherein the weight ratio of said high density polyethylene to said low density polyethylene in said blend is from about 1:1 to 1:3.

8. The method of claim 5 wherein said mixture additionally includes a filler.

9. The method of claim 8 wherein said filler is sand.

10. The method of claim 5 wherein said ionomer has a melt index of from about 14 to 100.

11. The method of claim 1 which comprises the steps of:
(a) providing a mixture comprising a powdery blend of high density polyethylene, low density polyethylene, and an ionomer,
(b) grinding or grit-blasting a ferrous metal surface to form an anchor pattern thereon,
(c) depositing said mixture on said anchor pattern of said ferrous metal surface, said metal surface being at a temperature sufficient to (1) cause said mixture to flow into said anchor pattern and (2) fuse said mixture to said metal surface, whereby said mixture melts to form a coating on said metal surface, and
(d) cooling the coated surface to effect the bonding of said coating to said metal surface.

12. The method of claim 11 wherein:
(a) the weight ratio of said high density polyethylene to said low density polyethylene in said blend is from about 1:1 to 1:3, and
(b) said ionomer has a melt index of from about 14 to 100 and comprises about 4 to 60 percent by weight of said blend.

13. The method of claims 11 or 12 wherein said mixture additionally includes a filler.

14. The method of claim 13 wherein said filler is sand.

15. The method of claim 12 wherein said mixture comprises about 20 to 48% by weight low density polyethylene, about 20 to 48% by weight high density polyethylene, and about 60 to 4% by weight ionomer.

16. The method of claim 15 wherein the weight ratio of said high density polyethylene to said low density polyethylene in said blend is about 1:1.

17. The method of claim 13 wherein said mixture comprises about 33⅓% by weight filler, about 22 to 30% by weight low density polyethylene, about 22 to 30% by weight high density polyethylene, and about 22 to 7% by weight ionomer.

18. The method of claim 17 wherein said filler is sand.

19. The method of claim 18 wherein the weight ratio of said high density polyethylene to said low density polyethylene in said blend is about 1:1.

20. The method of claim 12 wherein the deposition of said mixture on said ferrous metal surface is accomplished by entraining said mixture in an air stream and directing the air stream and entrained mixture onto said ferrous metal surface, said surface being at 500° to 700° F., and the resulting coating is kept at a temperature of about 400° to 600° F. for a period of about 5 to 15 minutes before cooling.

21. The method of claim 20 wherein said mixture additionally includes a filler.

22. The method of claim 20 wherein said mixture is deposited on said ferrous metal surface in a thickness of about 15 to 65 mils.

23. The method of claim 11 wherein said ionomer has a melt index of from about 14 to 100.

24. A composite article comprising a ferrous metal substrate having an anchor pattern on a surface thereof, and a coating adhered to said anchor pattern, said coating comprising a mixture of a polyolefin and an ionomer, said polyolefin being a member selected from the group consisting of polyethylene, polypropylene, an ethylene-vinyl acetate copolymer, an ethylene-unsaturated carboxylic acid copolymer, and an ethylene-unsaturated carboxylic acid ester copolymer.

25. The article of claim 24 wherein said metal substrate is a member selected from the group consisting of cast iron and ductile iron.

26. The article of claim 24 wherein said polyolefin is polyethylene.

27. The article of claim 26 wherein said mixture additionally includes a filler.

28. The article of claim 26 wherein said ionomer has a melt index of from 5 to 100.

29. The article of claim 26 wherein said ionomer has a melt index of from about 14 to 100.

30. The article of claim 24 wherein said polyolefin is a blend of high density polyethylene and low density polyethylene.

31. A coating mixture for application to a surface of a metal substrate comprising a blend of high density polyethylene, low density polyethylene and an ionomer.

32. The mixture of claim 31 which additionally includes a filler.

* * * * *